United States Patent
Wilson et al.

(10) Patent No.: US 8,509,847 B2
(45) Date of Patent: *Aug. 13, 2013

(54) CONNECTING MOBILE DEVICES VIA INTERACTIVE INPUT MEDIUM

(71) Applicant: Microsoft Corporation, Redmond, WA (US)

(72) Inventors: Andrew D. Wilson, Seattle, WA (US); Raman K Sarin, Redmond, WA (US); Kenneth P. Hinckley, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/730,582

(22) Filed: Dec. 28, 2012

(65) Prior Publication Data

US 2013/0115879 A1    May 9, 2013

Related U.S. Application Data

(63) Continuation of application No. 11/839,279, filed on Aug. 15, 2007, now Pat. No. 8,380,246.

(60) Provisional application No. 60/892,448, filed on Mar. 1, 2007.

(51) Int. Cl.
*H04M 1/00* (2006.01)

(52) U.S. Cl.
USPC ........................................ 455/556.1; 345/156

(58) Field of Classification Search
USPC ..... 455/556.1; 709/228; 715/702; 348/162; 713/168; 345/156
See application file for complete search history.

(56) References Cited

U.S. PATENT DOCUMENTS

| | | | |
|---|---|---|---|
| 6,393,484 B1 | 5/2002 | Massarani | |
| 6,624,597 B2 | 9/2003 | Dowling et al. | |
| 6,956,949 B1 | 10/2005 | Faber et al. | |
| 6,982,743 B2 | 1/2006 | Danilidis et al. | |
| 7,139,557 B2 | 11/2006 | Tang et al. | |
| 7,397,464 B1 | 7/2008 | Robbins et al. | |
| 2003/0151054 A1 | 8/2003 | Kuznicki et al. | |
| 2003/0226011 A1 | 12/2003 | Kuwano et al. | |
| 2003/0236991 A1 | 12/2003 | Letsinger | |
| 2006/0036944 A1 | 2/2006 | Wilson | |
| 2006/0072745 A1 | 4/2006 | Fukaya | |
| 2006/0080549 A1 | 4/2006 | Okamura et al. | |
| 2006/0149495 A1 | 7/2006 | Mazalek et al. | |
| 2006/0161774 A1 | 7/2006 | Huh et al. | |
| 2006/0294247 A1 | 12/2006 | Hinckley et al. | |
| 2007/0080931 A1 | 4/2007 | Chen et al. | |
| 2008/0214233 A1 | 9/2008 | Wilson et al. | |

OTHER PUBLICATIONS

Izadi, et al., "Dynamo: A Public Interactive Surface Supporting the Cooperative Sharing and Exchange of Media," ACM, UIST 2003, Vancouver, BC, Canada, 2003, retrieved at <<http://delivery.acm.org/10.1145/970000/964714/p159-izadi.pdf?key1=964714& key2=0641269611&coll=GUIDE&dl+GUIDE&CFID=12383531&CFTOKEN=70297152>>, last accessed Jan. 24, 2007, pp. 159-168.

(Continued)

*Primary Examiner* — Charles Appiah
*Assistant Examiner* — Alexander Yi
(74) *Attorney, Agent, or Firm* — Lee & Hayes, PLLC

(57) ABSTRACT

A mobile device connection system is provided. The system includes an input medium to detect a device position or location. An analysis component determines a device type and establishes a connection with the device. The input medium can include vision systems to detect device presence and location where connections are established via wireless technologies.

20 Claims, 15 Drawing Sheets

(56) References Cited

OTHER PUBLICATIONS

Non-Final Office Action for U.S. Appl. No. 11/839,279, mailed on Dec. 9, 2011, Andrew Wilson et al., "Connecting Mobile Devices via Interactive Input Medium", 12 pages.

Final Office Action for U.S. Appl. No. 11/839,279, mailed on Sep. 15, 2011, Andrew Wilson, "Connecting Mobile Devices via Interactive Input Medium", 14 pages.

Ott, et al., Towards Automated Authentication for Mobile Users in WLAN Hot-Spots, <<http://www.drive-thru-internet.org/pub/vtc2005fall-ott-kutscher.pdf>>, last accessed Dec. 27, 2006.

Rekimoto, et al., Proximal Interactions: A Direct Manipulation Technique for Wireless Networking, Human-Computer Interaction—INTERACT 2003, Published by IOS Press, IFIP, 2003, pp. 511-518. <<http://www.idemployee.id.tue.nl/g.w.m.rauterberg/conferences/INTERACT2003/INTERACT2003-p511.pdf>>, last accessed Dec. 21, 2006.

Valavanis, et al., MobiShare: Sharing Context-Dependent Data & Services from Mobile Sources, <<http://www.mm.aueb.gr/~chris/MobiShare-IEEEWIC2003.pdf>> last accessed Dec. 26, 2006.

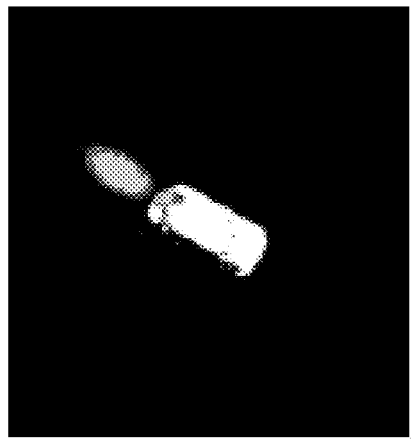
FIG. 6

CONNECTING MOBILE DEVICES VIA INTERACTIVE INPUT MEDIUM

CROSS REFERENCE TO RELATED APPLICATION

This application is a continuation of, and claims benefit of, U.S. patent application Ser. No. 11/839,279 filed on Aug. 15, 2007, entitled "CONNECTING MOBILE DEVICES VIA INTERACTIVE INPUT MEDIUM," which claims the benefit of U.S. Provisional Patent Application Ser. No. 60/892,448 filed on Mar. 1, 2007, entitled "CONNECTING WIRELESS MOBILE DEVICES ON INTERACTIVE SURFACES USING VISION-BASED HANDSHAKING," the entirety of which are incorporated herein by reference.

BACKGROUND

Associating and connecting wireless mobile devices is often a cumbersome process. For instance, transferring a file from a phone using Bluetooth involves a pairing process in which the name of the target device must be known or recognized by the user, further navigation of a number of dialog boxes, and possibly the entry of passwords by the respective user. Part of the difficulty of this process lies in the lack of physical grounding during the connection process—for example, physical feedback plays no role in establishing or breaking the connection. Unlike wired connections, wireless connections have no obvious physical representation in the real world.

Previous systems have explored detecting synchronous events such as touching or bumping devices together or pressing the same key simultaneously as ways of associating two wireless devices in a physically-grounded manner. This approach not only restores some of the tangible feedback of establishing a wired connection, but also allows appropriately equipped devices to find each other automatically. For example, two devices that are equipped with accelerometers may associate based on the observation that "bump" events were recorded at nearly the same point in time. That such a co-occurrence in time may happen accidentally is thought to be unlikely, particularly when near-field wireless communication techniques such as Bluetooth are used. Other systems have demonstrated techniques to connect a mobile device to a large display by having the display present a randomly chosen key which the user then enters on the mobile device. Since the key is only visible to the user as they are viewing a display, the display system has some guarantee that it is connected to the correct device. This key can take the form of an alphanumeric string to be entered on a device keypad, a sequence of motions that are then matched by an accelerometer-equipped device, or a visual pattern shown on the display which is then captured and decoded by camera phone, for example.

Established RFID technologies and upcoming near field communication (NFC) techniques can support device association if the device is equipped with the appropriate radio frequency (RF) tags. Typically this will entail the use of short range (0 to 3 inches) RF identification (RFID) readers which require the placement of the tagged device on a small reading surface. Longer range RFID readers, on the other hand, present the opposite problem: as a user it is difficult to judge whether a given tag is within reading range. This uncertainty can lead to unintended connections and/or raises privacy and security concerns.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Mobile devices are automatically detected and subsequently connected to host systems where device data can be seamlessly exchanged between the devices and/or the respective host system. In one aspect, components are provided for associating a mobile device to an interactive surface employing a combination of computer vision and wireless technologies. For example, users establish a connection of a mobile device to a host system by placing the device on a table surface although other input media could be employed such as an LED input/output display. When the computer vision process detects a phone-like object (or other mobile device) on the surface, the system follows a handshaking procedure using wireless signals (e.g., Bluetooth) and vision techniques to establish that the device on the surface and the wirelessly connected device are the same device. The connection can be broken if desired by removing the device although the connection can remain allowing further communications via wireless signals. Furthermore, a vision-based handshaking procedure also determines the position of the device on the interactive surface, thus permitting a variety of interactive applications which enable the presentation of graphics co-located with the device. As an example, an interactive system enables the exchange of automatically downloaded photos or other media by selecting and dragging photos from one camera device to another.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 6 illustrates example images of port modulating to perform handshaking with a device

DETAILED DESCRIPTION

Systems and methods are provided for automatically detecting mobile device locations and subsequently establishing connections with the device. This includes components to automatically associate and connect a wireless mobile device with a vision-based interactive surface, for example. Visual handshaking procedures can be employed to determine which of the available wireless or mobile devices are actually on the interactive surface. Devices are connected to the host system (and possibly to each other) by virtue of having been placed on the surface by the user. Such interaction grounds the act of connecting devices in a manner that is naturally intuitive to users who would otherwise find conventional association methods too difficult to use. Furthermore, since the combination of handshaking and interactive surfaces allows the tracking and precise positioning of multiple devices on the surface, numerous interactive scenarios are enabled, such as the display of documents and user interface elements that are associated with the device, and the connection and interaction with multiple devices.

As used in this application, the terms "component," "connection," "surface," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
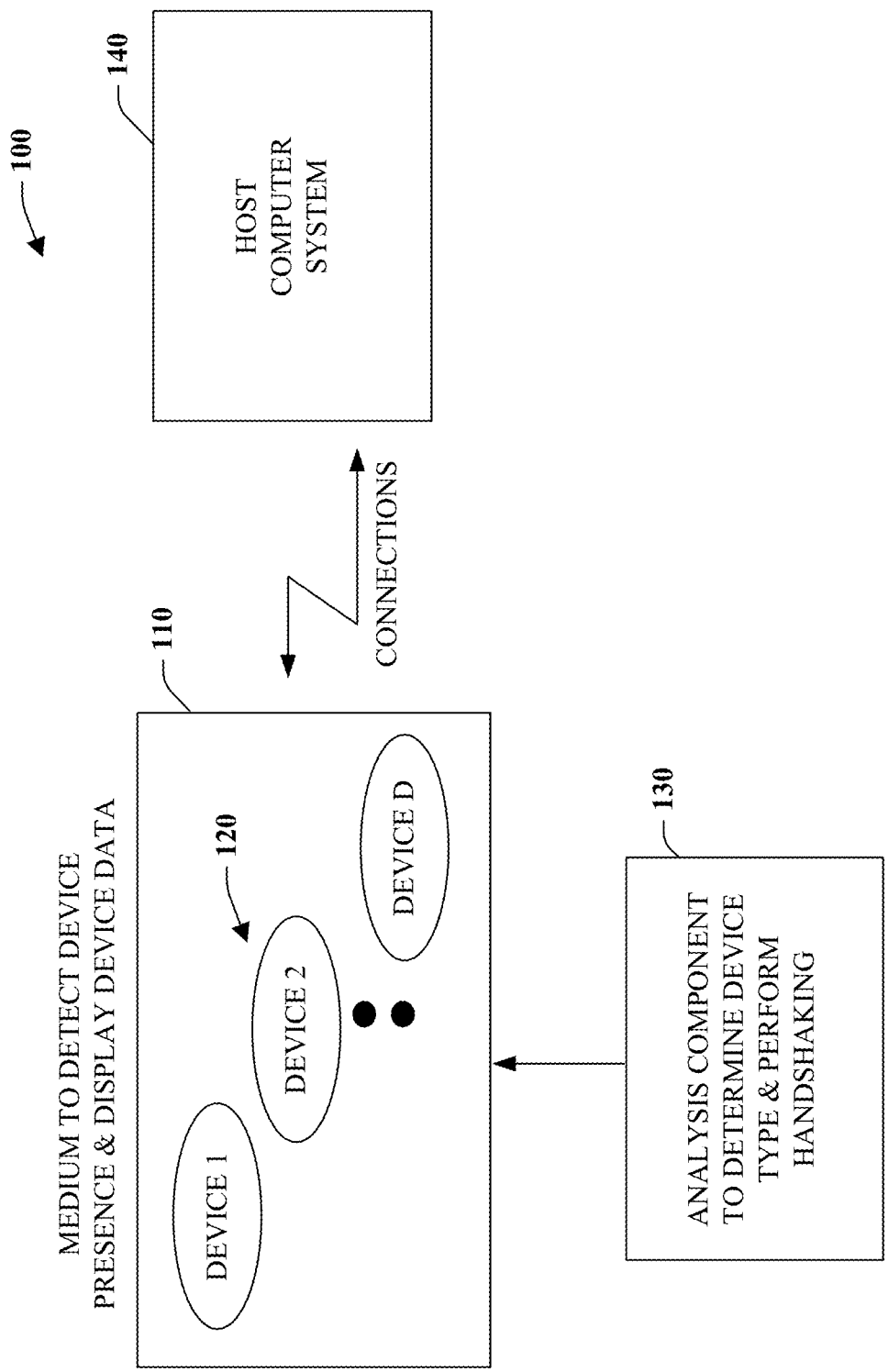
FIG. 1 is a schematic block diagram illustrating an interactive system for connecting mobile devices.

Referring initially to FIG. 1, an interactive system 100 is illustrated for establishing connections between mobile or wireless devices. The system 100 includes an interactive medium 110 that can detect one or more wireless devices 120 on the medium. The interactive medium 110 can include input and output capabilities to establish connections between devices 120 and/or connections with a host system 130 such as a desk top personal computer, for example. Output capabilities of the medium 110 allow data associated with a device 120 to be displayed or presented with the respective device. As will be described in more detail below, vision components can be provided to form an input/output surface for the devices. As can be appreciated, substantially any type of medium 110 that can detect the presence of a device 120 and/or display device data can be employed. For example, an LED I/O device could be employed. One or more connections can be provided on the input medium 100 between the respective devices 120. This can include one-to-one connections between devices 120, one-to-many connections, or substantially any type of connection that can be established between one or more devices 120 and one or more other devices that are suitably located on the medium 110. As shown, an analysis component 140 can be provided to determine a device type such as a cell phone versus a camera or a particular model. Such analysis includes further handshaking between the device and the host computer system 130 as will be described in more detail below.

In one example, the medium 110 can include interactive surfaces (e.g., tables) to facilitate connecting mobile devices 120. Unlike vertical displays, horizontal interactive displays afford the placement of multiple devices and the display of co-located graphics or other data. A device association can be provided by the analysis component 140 which establishes connections between multiple devices 120 and an interactive surface. The device 120 is connected automatically when the user places it on the interactive surface or medium 110. This connection is then broken when the user removes the device from the surface. Alternatively, the connection can be maintained after the device is removed via wireless signals, for example. This interaction is intuitive and easily understood by users. In particular, device association techniques can employ computer vision components to bootstrap and verify wireless (e.g., Bluetooth) connections to devices 120 placed on the interactive surface or medium 110. A feature of the medium 110 and the analysis component 140 determines the position the devices are on the surface, thus enabling a wide variety of interactive scenarios which RFID and NFC technologies do not readily support. This can be achieved without adding hardware requirements to mobile devices. In a related aspect, a wireless device connection system 100 is provided. The system includes means for detecting presence (input medium 110) of at least one wireless device 120 and means for analyzing feedback (analysis component 130) from the at least one device. This also includes means for establishing a connection (host system 140) with the at least one device.

Figure 2:
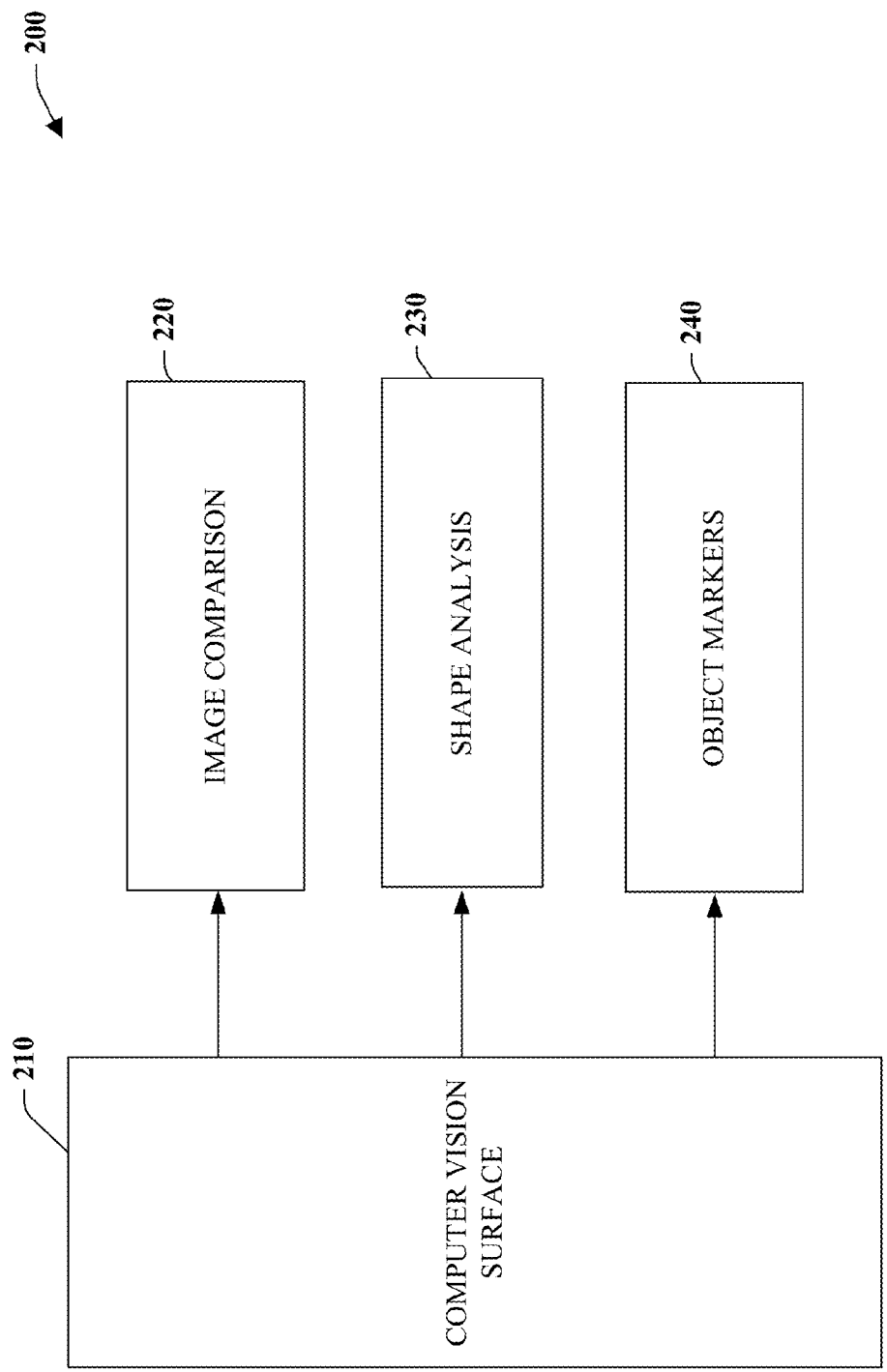
FIG. 2 is a block diagram that illustrates device detection aspects for a computer vision surface.
Figure 3:
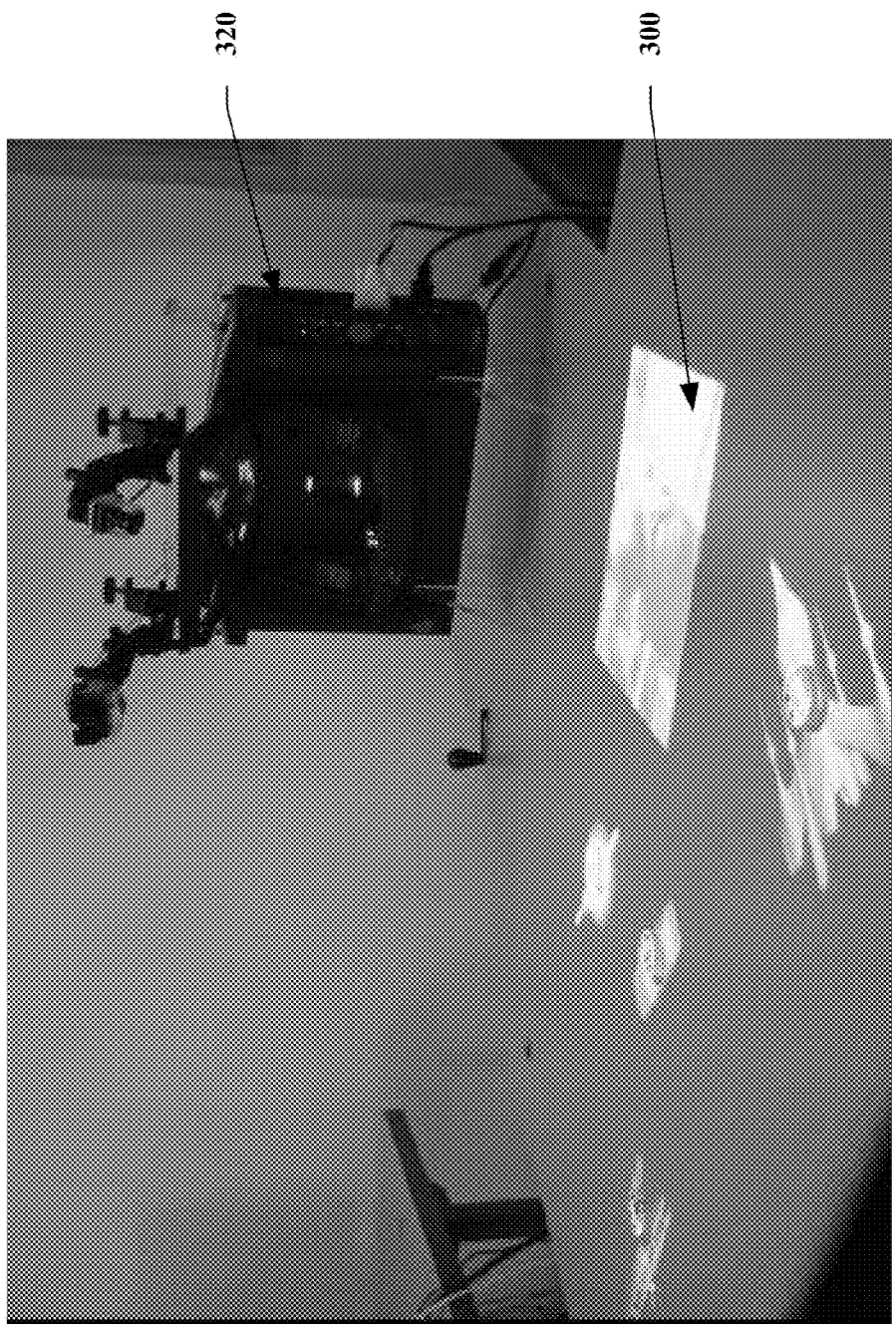
FIG. 3 illustrates an example surface for detecting and communicating with mobile devices.
Figure 4:
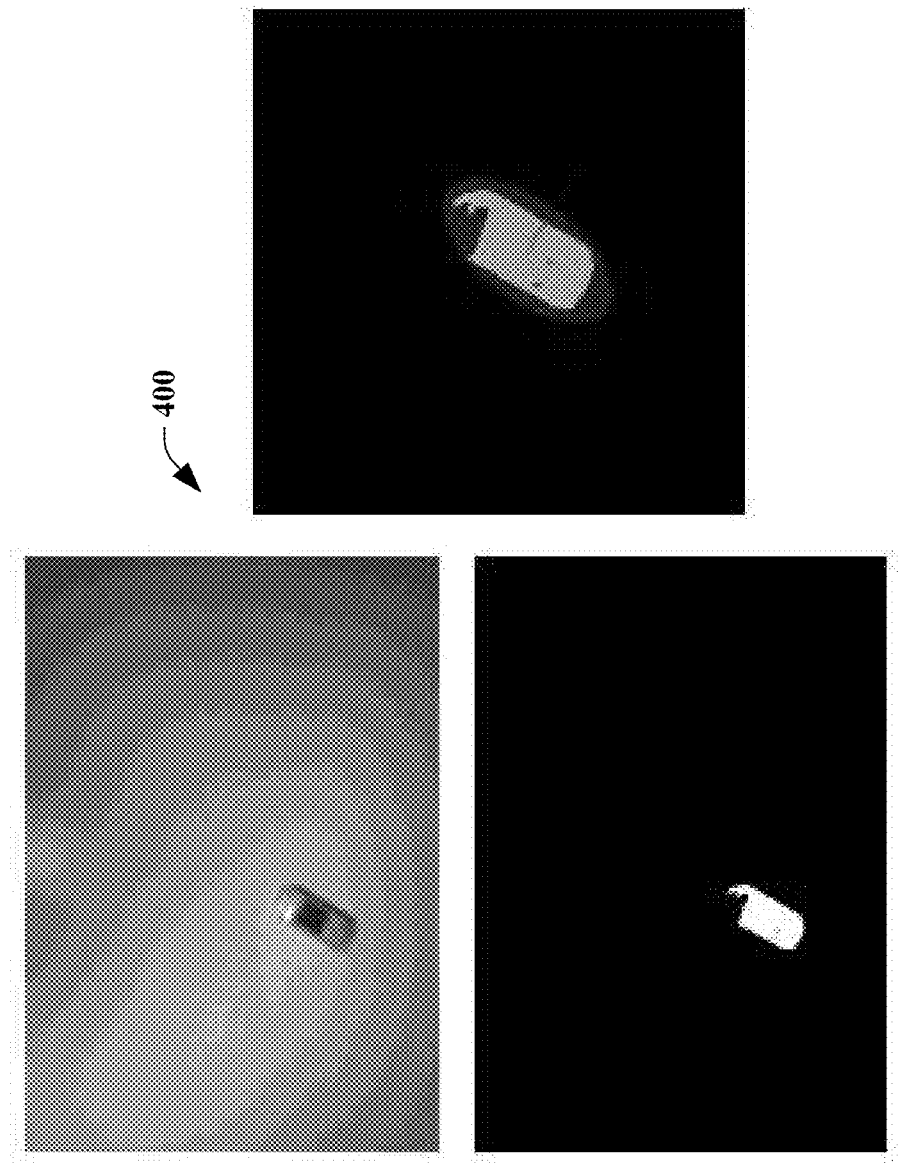
FIG. 4 illustrates example captured images for a detected mobile device.

In one example, the interactive system 100 initiates the automatic transfer of camera phone photos or other data. Thus, after taking a number of snapshots, the user places their phone on the medium 110, and the photos automatically display in proximity to the phone, onto the interactive surface or medium. A second user may then place their phone on another part of the medium 110, resulting in the display of their photos. Photos may then be exchanged from one device 120 to the other by dragging a photo from one device to the other. These interactions benefit substantially from the position information determined in the handshaking process noted above. As can be appreciated, other types of data than image data (e.g., audio data) can be communicated and other types of devices 120 than cell or camera phones can be employed (e.g., digital cameras, hand held computers, keyboard, mouse, PDA's, and so forth). FIGS. 2-4 will now be described collectively to illustrate an example vision system for detecting mobile devices and establishing communications with such devices.

Referring now to FIG. 2, an example system 200 is illustrated for detecting devices and establishing connections with such devices. Interactive surfaces are often equipped with sensors to detect the user's touch, and many also have the ability to detect the presence of other physical objects. Computer vision is one example technique that is useful in the location, tracking and identification of objects placed on a computer vision surface 210. The computer vision surface 210 employs a projector and vision-based sensing for compact interactive surface applications. This can include an infrared-sensitive camera and infrared illuminant to monitor the user's gestures and the placement of objects on an everyday surface such as an office desk such as illustrated at 300 of FIG. 3. A camera can be positioned and calibrated to monitor an active display area of a projector 310, such that when objects are detected by vision processes, the system may then display graphics that are registered with the physical object or device. Since the camera senses near-infrared light (approximately 900 nm, just beyond visible, and not impacted by heat sources), the sensed image does not include the projected image composed of only visible light.

Referring back to FIG. 2, computer vision systems 210 exploit the flexibility that modality affords. For example, it is straightforward to detect the placement of objects on the surface 210 by comparing the most recent image of the surface with a reference image of the empty surface at 220. This can be achieved by computing the pixel-by-pixel difference between a reference image and current image. Pixel differences that are greater than a pre-determined threshold are marked in a new image as '1' while others can be marked as '0.' Following this binarization process, connected components analysis then groups sets of adjacent pixels with value '1', yielding a rough list of the spatially distinct objects on the surface 210. This process can be repeated for substantially every frame at a rate of 30 Hz. In conjunction with the connected component analysis algorithm, various statistics about the shape of each object may be computed at 230. For example, geometric moments (mean, covariance) of the connected component pixel locations may be computed to determine an ellipse fit to the connected component, giving a rough indication of the size and orientation of the object on the surface.

While the field of computer vision offers more sophisticated object recognition techniques, an ellipsoidal model in one example can be employed to detect when a mobile phone is placed on the surface 210 by detecting the stable observation of an object with an ellipsoidal model with e.g., phone-like dimensions, with wide tolerances to accommodate a variety of models such as shown detected in FIG. 4. This approach allows highly interactive performance. While sophisticated object recognition techniques may be able to recognize a given mobile device model, it provides little help in distinguishing two devices of the same model. An alternative approach to uniquely identifying a physical object by computer vision is to use visual markers or codes at 240 that are applied directly to the object. However, such codes are often visually unappealing, utilize a significant amount of space on the device, and, since they are generally static, are easily copied. As will be described in more detail below, wireless signals can also be employed to identify device characteristics.

Figure 5:
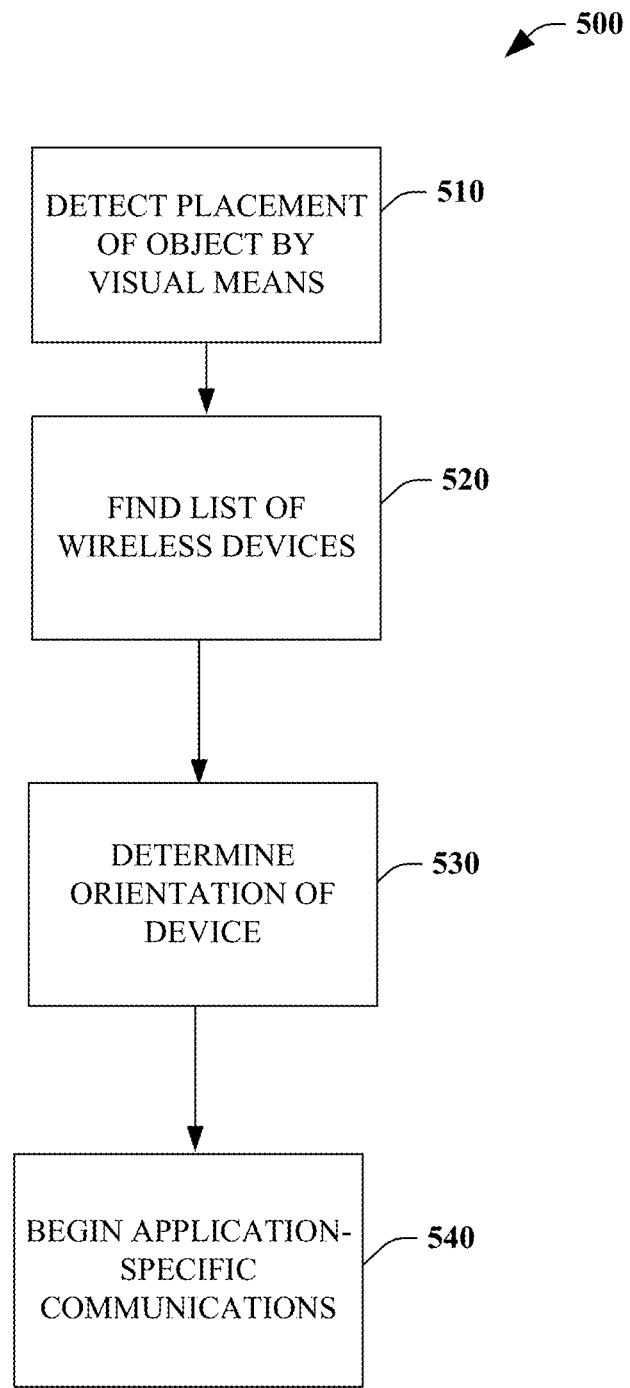
FIG. 5 illustrates a process for handshaking between detected devices and a host system

Turning to FIG. 5, a handshaking process 500 is illustrated. While, for purposes of simplicity of explanation, the processes are shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

The process 500 employs a vision-based interactive surface system to identify and position mobile devices as they are placed on the surface. The process leverages the capabilities of existing mobile devices. In general, the interactive surface system ("host" system) is employed to connect to each available wireless or Bluetooth device and have the device in turn provide a signal that is visible to the computer vision system. If the signal is detected, the system will determine that it is connected to the device on the surface at a given location. The basic handshaking algorithm is summarized in the process 500 as follows:

At 510, detect the placement of a new phone-shaped object by visual means. This includes the vision-based systems described above. At 520, determine or find a list of all switched-on wireless or Bluetooth devices. For each device at 520:

a. Attempt to connect to the device over Bluetooth. Continue if the device advertises a designated service GUID, else move on to the next device.

b. Command the device to blink its IRDA port.

c. If the blink is detected at the position of the object go to 530, else move on to the next Bluetooth device.

At 530, determine the orientation of the device. This is an optional act and is described in more detail below with respect to FIG. 7. At 530, begin application-specific communications via wireless or Bluetooth, passing on position and orientation information to application running surface interactions.

Similar to long range RFID, Bluetooth may not be suited to determine if a device has been placed on the table surface, but it can be used to suggest a list of mobile devices that might be on the surface. Furthermore, a connected Bluetooth device may be programmed to identify itself visually to the host system by modulation of light sources that the vision system is able to detect (e.g., infrared light from the IRDA port, light from the mobile device display, or controllable notification LEDs) as described below with respect to FIG. 6. When discovered by the vision system, the wireless or Bluetooth connection may be used to exchange application data such as photos, contact information, remote user interfaces, and so forth.

Referring now to FIG. 6, a signaling process is described where devices identify themselves to the host system. The host system is equipped with a Bluetooth transceiver. When a phone-shaped object is detected, the host invokes a wireless or Bluetooth API to collect a list of Bluetooth devices in range (the devices need not be "paired" in the Bluetooth sense). Since Bluetooth has a range of about 30 feet, this list can include devices that may not be on the surface, or even in the same room, so it determines which of these wireless devices correspond to the phone-shaped object just placed on the surface (if any).

Typically, mobile devices that participate with the interactive surface system described above runs software designed to process the following handshaking process: the interactive system initiates a Bluetooth connection to each available Bluetooth device. If a device is found to be running the software (as indicated by particular Bluetooth service GUID), the connection will succeed and the interactive surface system is then able to exchange data and commands with the mobile device via a socket connection. The host system then requests that the process trigger the infrared (IRDA) port to blink for a short period of time as illustrated via the images 600 in FIG. 6.

If the connected, the device is on the surface, the infrared vision system detects blinking of the IRDA port at nearly the same time it requests the blink, thus confirming that the connected device is on the surface. If no blink is detected, the host moves on to the next Bluetooth device and repeats the process. The technique of driving the association process by a synchronized signal in the image is motivated by the observation that a signal in one modality and a signal in another modality are very unlikely to be synchronized in time. This depends largely on scope of what is being sensed: because the monitored space of the table top is rather small, matching signals are unlikely to happen by chance.

The vision system detects the blinking of the IRDA port by computing the pixel-wise difference of the input image with a like image collected at the beginning of the identification process. Such difference images highlight areas that change during the blinking process, and as such may be used to detect the blink from the image. As noted above, connected components are found from the difference image. Such connected components correspond to blinking infrared light from IRDA port directly, or from the same light reflected off the surface if the IRDA port is oriented out the side of the device as shown in FIG. 6

The described signaling technique supports placing more than one connected device on the surface at time. This enables a wide variety of interactions on interactive surfaces. For example, projected icons of documents or user interface controls for each device may be co-located with the device on the surface, and multiple devices may be connected to exchange data. For such applications it is desired to confirm that the observed blinking pattern matches with the newly acquired surface object. This is achieved by confirming that the blinking pattern coincides with the position of the candidate object by computing the distance between the blinking connected component and the object's connected component.

Figure 7:
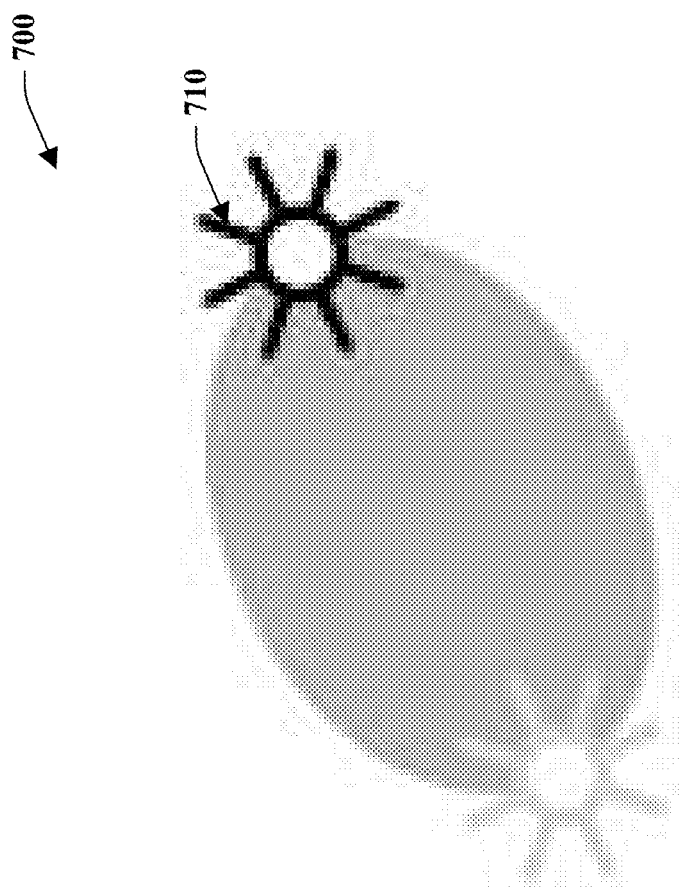
FIG. 7 is a diagram that illustrates detecting a device orientation.

Referring now to FIG. 7, a diagram 700 illustrates an optional aspect of determining an object's orientation on a surface. In many cases, it is useful for applications to determine the orientation of the device on the respective surface. For example, user interface graphics can match the orientation of the device to maintain readability from the user's own orientation, or transferred documents can be shown to emanate from the front of the device. In one example, an ellipsoidal model yields the orientation of the object, but generally up to a 180 degree ambiguity. Since IRDA ports are typically located at the end of the device, the position of the blinking connected component can be used to overcome the ambiguity in orientation. The handshaking process noted above in FIG. 5 determines which end of the object connected component is nearest to the blinking connected component at 710, and updates the orientation accordingly.

When connected and visually verified, the host is free to exchange application data such as camera phone pictures, contact information, and so forth. During this time, the shape of the device may be tracked frame-to-frame by the vision system, such that projected graphics associated with the device may follow its movement. When the user revokes the connection to the host, they may simply remove the device from the surface. At this point the vision system will lose track of the phone or device. The above IRDA port blinking procedure may be run again to verify that the device has been removed from the surface. In the case of top-down projection vision systems, where users may occlude device objects by their hands and arms, it is helpful to build in tolerances for long dropouts in the appearance of the object, and to drop the wireless or Bluetooth connection after an extended period of time.

Figure 8:
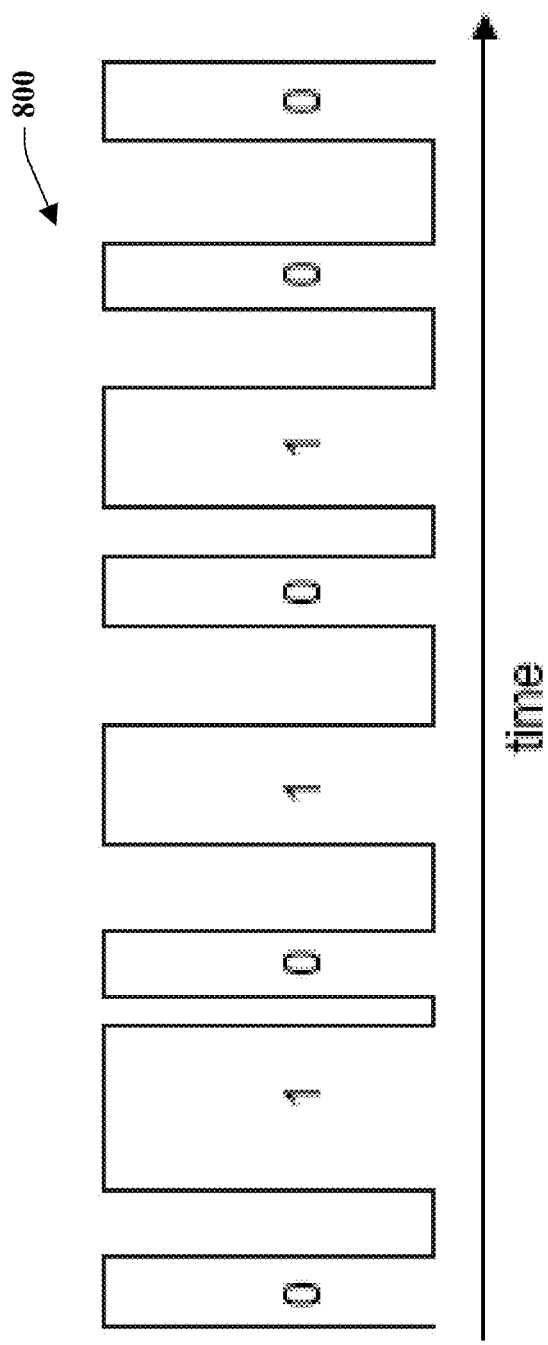
FIG. 8 illustrates a pulse modulation signal for communicating with a device.

Referring now to FIG. 8, an example signal 800 illustrates an example modulated code that can be exchanged between devices and host systems. In some cases, spurious "blinking" may be detected if the user moves their hands over the phone or device at the moment that the host requests some connected phone to blink its IRDA port. This may result in an association with the incorrect device. Cooperative users that understand that the handshaking process may take time and are likely to place the phone down and wait until the transfer is complete before continuing. But some uses may inadvertently trigger an incorrect association by waving their hands over the phone at the right moment, thus spoofing the simple change-detection blinking pattern. A natural extension of the handshaking process is for the IRDA device to modulate the IR LED using a unique pattern, such that the vision can verify the device connection by recovering the same pattern. For example, the device can communicate a unique binary code as depicted by the signal 800. A further elaboration would be for the host to select a random key value each time it requests a device to blink. This key is then transmitted via wireless or Bluetooth to the device with the blinking request, possibly encrypted. When the host recovers the same key value from the blinked code, it can be reasonably certain that the visual signal it received was non-accidental.

As shown, an 8 bit key which can be communicated to the host by pulse-width modulation (PWM) of the IR LED on the mobile device. The software on the device obtains direct control over the IRDA port in order to modulate the IR LED directly. "On" and "off" pulses are generated by holding the IR LED on for 300 ms and 150 ms respectively, with a 150 ms break between each pulse. As can be appreciated, other times and number of bits can be employed for signaling. The average total time per pulse is thus 375 ms, yielding a transmission rate of 2.67 bits per second, and an average time of 3 s to transmit an 8 bit code. An 8 bit code length is sufficient to prevent confusion with extraneous motion on the interactive surface, as well as prevent spoofing attempts made by the less determined users. Longer code lengths are possible, of course, but possibly at the expense of lengthening the handshaking process.

Since the handshaking technique employs testing each device in turn, the total time to complete the handshaking process is proportional to the number of candidate devices. In some systems, the initial computation of the list of available Bluetooth devices and the code transmission time dominates the total time to complete the handshaking process. If the code is made longer, or the number of candidate devices is large, the time to complete the handshaking may be too great to be useful in interactive system. There are a number of strategies available to speed the process. First, the host system can terminate the code transmission process early if the first bits of the code are not seen immediately after the request to transmit the code is made. The host may then move to the next device. Secondly, the host vision system can employ cameras with higher frame rates. Current prototype uses a video camera running at standard NTSC video rates (30 Hz), but higher frame rates are available. Most notably, common CMOS image sensors include the ability to set a region of interest (ROI) over which light levels are measured. Pixels belonging to the ROI are transmitted to the host. In the case of CMOS imagers, the resulting frame rate is proportional to the size of the ROI. Initial experiments with CMOS cameras and IR LEDs show that it is possible to obtain frame rates of 500 Hz with a small ROI around the LED. This suggests a way to speed the code transmission process: first, set the IR LED on for a pulse long enough to enable the host vision system to find it with no ROI set (whole frame visible, 30 Hz). Then set the position of a small ROI centered on the recovered location of the LED. The camera may then match a high bit rate transmission from the device.

Figure 9:
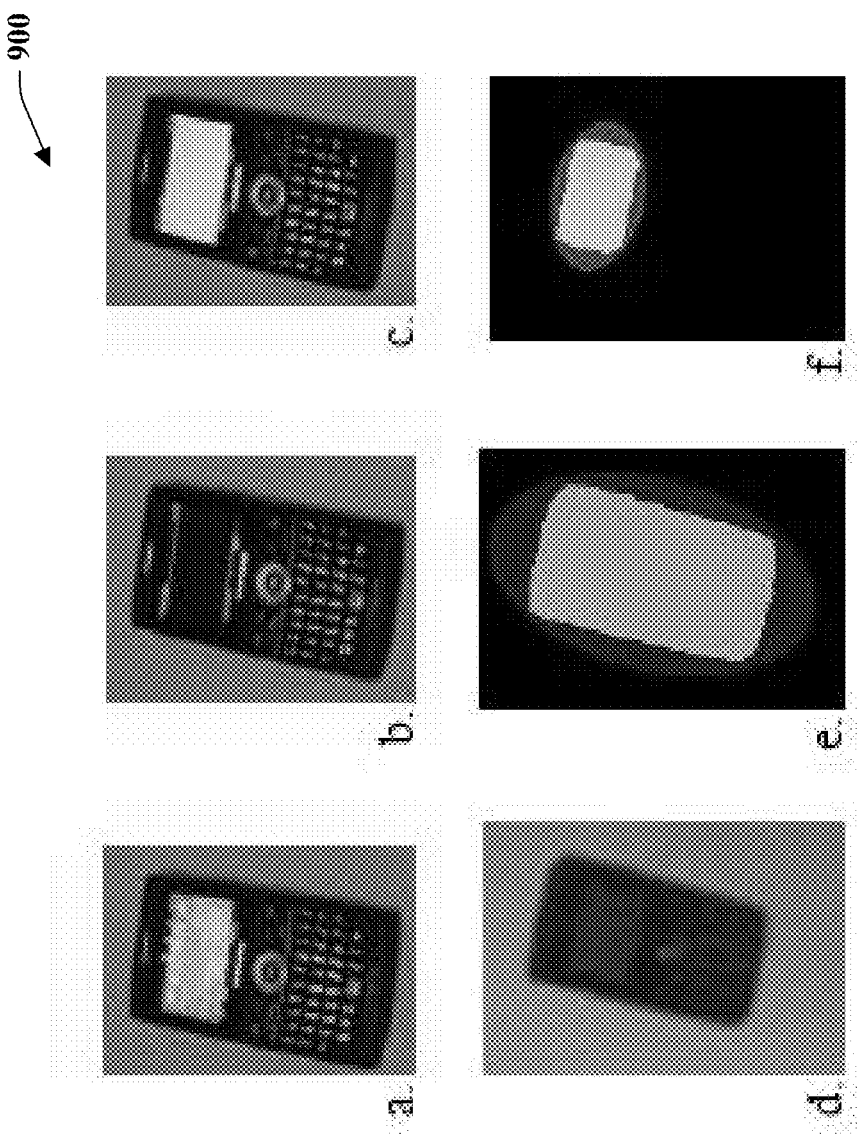
FIG. 9 illustrates a display modulation technique to communicate between devices and host systems.

Referring to FIG. 9, example device signaling displays 900 are illustrated for light modulation. The use of the IRDA port in the handshaking process has a number of distinct advantages. Near infrared is directly supported by vision-based interactive surface system, where its use allows the vision system to ignore projected (visible) graphics, and to work in a variety of indoor ambient light conditions. Also, since infrared is invisible to the naked eye, the vision-based handshaking process is invisible to users, and thus does not intrude on the overall interaction. This contrasts with related synchronization approaches that use visible codes or markers. Such visible patterns require space, are visually distracting and are often difficult to make visually appealing. Unfortunately, while IRDA ports have been very popular standard features on smart phone and other mobile devices, many of the latest devices may not include IRDA functionality.

To address this issue, various visible light-based strategies which involve the modulation of the device's display as shown in the differing display 900. This approach operates similarly as with the IR LED, except that rather than turning the IR LED on and off, a region of the display may be turned on (painted white) or turned off (painted black) as shown in FIG. 9. One system employs the same PWM scheme to modulate the display as to modulate the IR LED, and the same code can be used to recover both types of signals from the image. However, because today's transmissive displays use backlights that are invisible in the infrared, some systems can include a second camera sensing in the visible domain expressly for the purpose of recovering visible light modulation. This second camera is similar to the primary infrared camera except that no IR-pass filter is applied.

During the handshaking process, the host can observe the appropriate modulation in both the visible and infrared channels concurrently, or the host system can query the connected device for its preferred method. Since animated projected graphics can confuse vision processes working in the visible channel, it is useful to limit the analysis of the visible channel to the region corresponding to the device's display, and possibly control the presentation of any graphics placed directly on the device itself. Modulating some portion of the screen is an attractive alternative to modulating the IR LED because most mobile devices will have a display, and thus the approach is compatible with most mobile devices. However, modulating the display can be visually distracting, and employs temporarily taking over the user interface shown on the display. Other related visible channel approaches include modulating notification LEDs that are placed on the front of a device, typically next to the display, and modulating backlight levels. These approaches may be less obtrusive.

Figure 10:
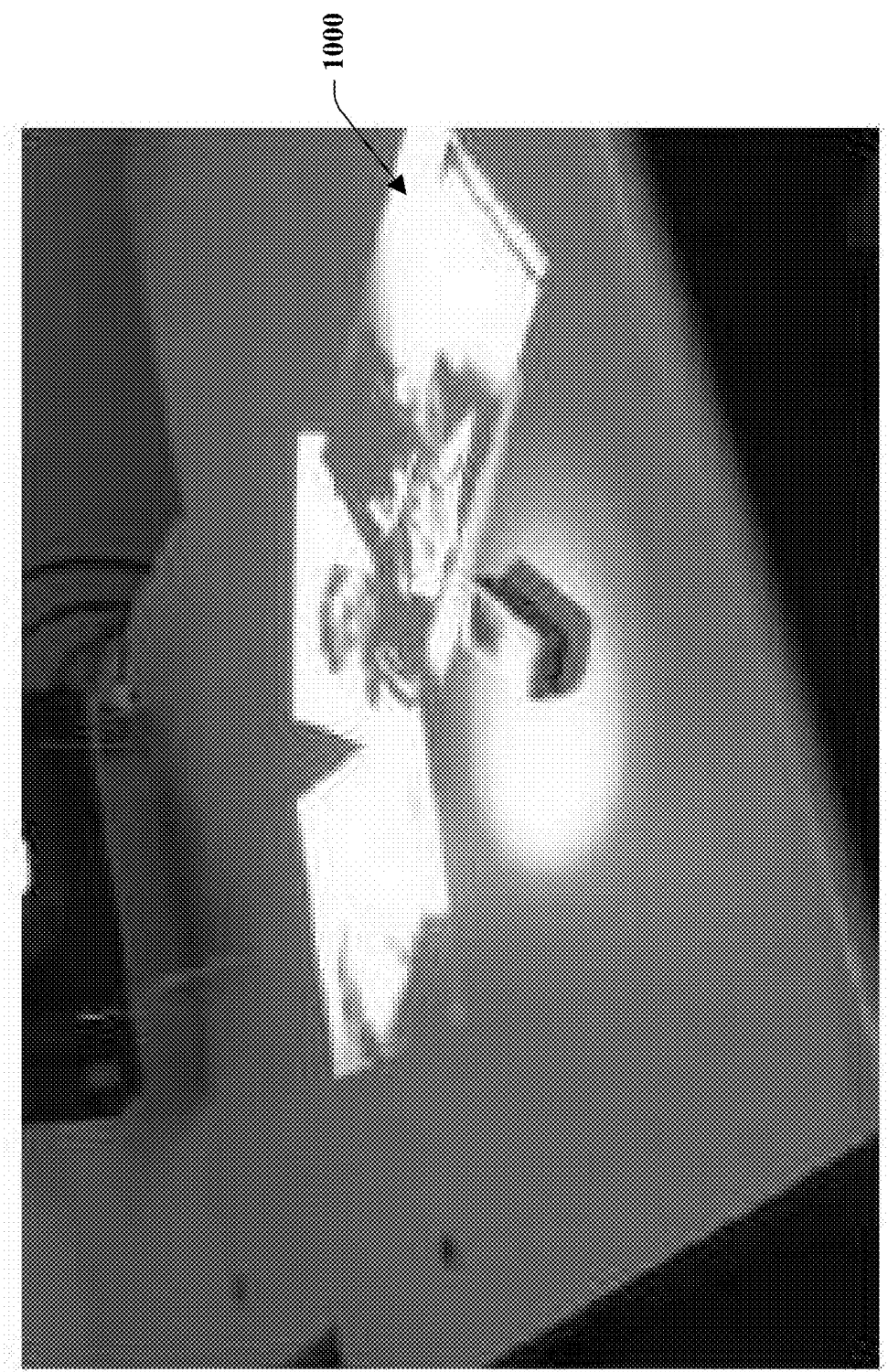
FIG. 10 illustrates device data being located within proximity of a device on an interactive surface.
Figure 11:
FIG. 11 illustrates positioning device data on an interactive surface.
Figure 12:
FIG. 12 illustrates communicating data between devices on an interactive surface.

Referring now to FIGS. 10-12 collectively, applications for synchronizing photographic displays with a device are illustrated. To demonstrate device-to-surface connection techniques, an application based on the scenario of transferring photos from a camera phone to the interactive surface and/or another mobile device is shown. It is to be appreciated that other types of data such as tables, charts, graphics, icons, animations, and so forth can similarly be displayed with the devices. After the user has taken a number of photos with their phone, they may simply place the phone on the interactive surface as shown in FIG. 10 to initiate the transfer to the host device.

During the wireless or Bluetooth/vision handshaking process, graphical feedback in the form of a pulsating blue halo is projected directly on the phone. This indicates to the user that the connection is in progress. As pictures are transferred over Bluetooth, they appear to fly out of the top of the phone, and are arranged in a messy stack, as if they were casually tossed on the surface of the table as shown at 1000 of FIG. 10.

The user may move, rotate and resize each of the photos by directly placing their hands on the photo and using natural gestures (e.g., rotating the hand to rotate the photo, pulling two hands apart to enlarge). The user may bring a given photo the top of a stack of photos by simply touching any part of the photo. The free transform of the photos is accomplished by computing the optical flow corresponding to the hand motion over the currently selected (topmost) photo and computing the best rotation, translation and scaling factors that fit the optical flow field as shown in FIG. 11.

While the table shows the transfer of data from a single device to the host, it is natural to consider placing multiple devices on the surface. Since the image processing and handshaking procedure determines each device as a distinct object on the table, the approach supports multiple concurrent devices. This suggests a number of interesting applications: for example, two people can meet over an interactive surface, place their mobile devices on the surface and "drag" documents or other data from one device to the other. When either user wishes to terminate the interaction, they merely remove their device from the surface.

The surface supports the exchange of photos by dragging a photo graphic onto the blue halo of any connected device (other than the one that contributed the photo). When the photo is close enough to the target device, the transfer of the file on the host system is initiated over wireless or Bluetooth, and the transfer process is depicted graphically by an animation of a moving graphic (red ball) from the device which originally contributed the photo to the target device such as shown in FIG. 12. This animation makes it clear to the user that the transfer is underway, and from which device the photo originally came. This multiple device interaction also demonstrates the use of infrared-based handshaking and visible light handshaking. Where one of the phones may not have an IRDA port, visible light modulation as discussed above can be employed.

Figure 13:
FIG. 13 illustrates a computer user interface that is presented with a device on an interactive surface.

Referring now to FIG. 13, an example user interface 1300 is projected in accordance with a detected device 1310. As shown, a co-located presentation of a connected device 1310 and a larger display 1300 around the device suggests applications in which a user interface (UI) is moved from device to the surface display (and back again) as desired. For example, interactions that are difficult on small-screened devices might be replicated on the larger screen, where interaction and reading large bodies of text is easier. User interfaces for such interactions might spill from the device onto the surface as shown at 1300 of FIG. 13.

Similarly, interactions can migrate from the surface to the device while it is on the surface. This redirection can be useful when the device display and user interface has higher fidelity than that of the interactive surface: consider an interactive system with no touch capability. In this case, the user interface elements such as buttons might be captured to the device while it is on the surface. Button presses and stylus events could be forwarded to the surface system, while the function and onscreen presentation of the device might depend on where the device is placed on the surface. Also, this migration between devices of differing display sizes can support the choices based on the users' privacy needs: documents on the large surface are more likely to be seen publicly, which documents on the mobile device might be more private in nature. In a group or collaborative setting, it might be useful to quickly move documents on the mobile device to the more public large display.

In other examples, camera phone devices can be connected by virtue of users having placed them on the surface. The sensing system and handshaking process also allows tracking of the devices on the surface. In the case of the systems described above, this was used to bring photos up next to the device which provides them, such that the transfer of photos from one device to the other can be done naturally by dragging a photo from one device to another. The ability to connect to and track multiple concurrent devices leads to a number of scenarios involving multiple devices. For example, a mechanical keyboard and a mobile device might be automatically connected if they are placed close to one another on the interactive surface, so that keystrokes are directed to the mobile device.

The orientation of each of the devices on the surface may also play a role in whether devices are connected. For example, two devices that are pointed at each other might be connected, mimicking the manner in which two IRDA devices must be arranged to "see" each other's signal. Devices that are oriented along the same general direction might be considered a connected group, perhaps if they belong to the same user, while devices at other orientations are assumed to be from another user and are so grouped separately. The surface display can make the various connections clear by drawing the connections as they are made and broken. Such illustrations can help address the problem that it is often difficult to determine active wireless connections. Activity along the connection can be illustrated by appropriate animation and color, as used in the surface transfer process noted above. Furthermore, if the surface is capable of sensing touch, users could establish, break and move connections by directly manipulating their graphical representation on the surface.

When multiple devices are placed on the surface to be connected, applications can decide whether each device maintains a separate connection to the host, or whether the devices establish direct connections to each other, with the host system coordinating the connections. In the former case data from a device is forwarded on to a second device by the host (in which case the two devices can be said to be "logically" connected). While the latter may be desirable in some applications, it is noted that during the time that the devices are on the surface, a connection to the host may be utilized to provide some feedback in the form of the projected display. Establishing a direct connection to the device may be a useful strategy in cases where the users are more likely to trust each other than they do the host system (as in a public kiosk), in which case sensitive data would be transferred over the direct connection, and only enough information to construct useful feedback (or anonymized data) would be sent to the host.

Figure 14:
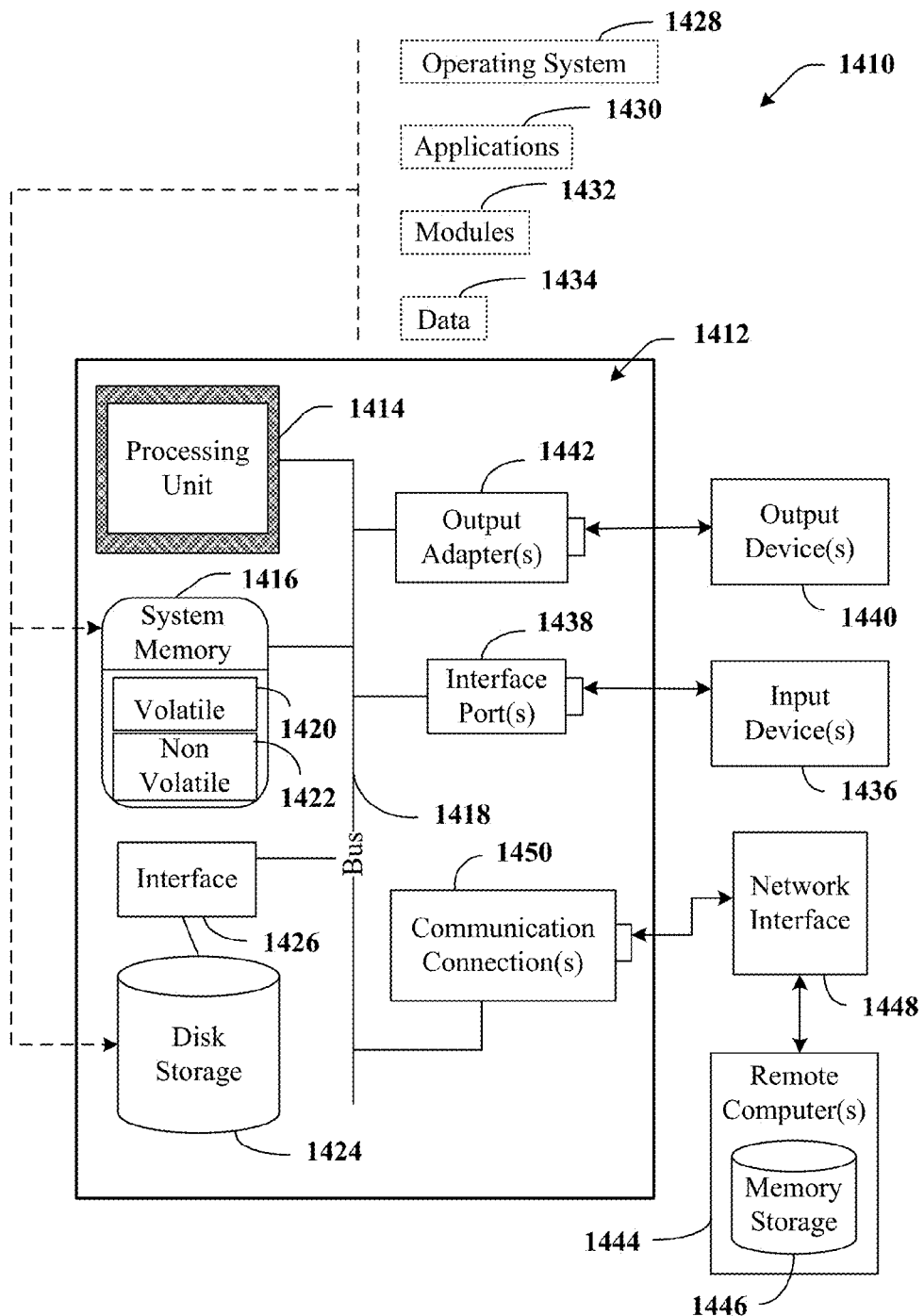
FIG. 14 is a schematic block diagram illustrating a suitable operating environment.
Figure 15:
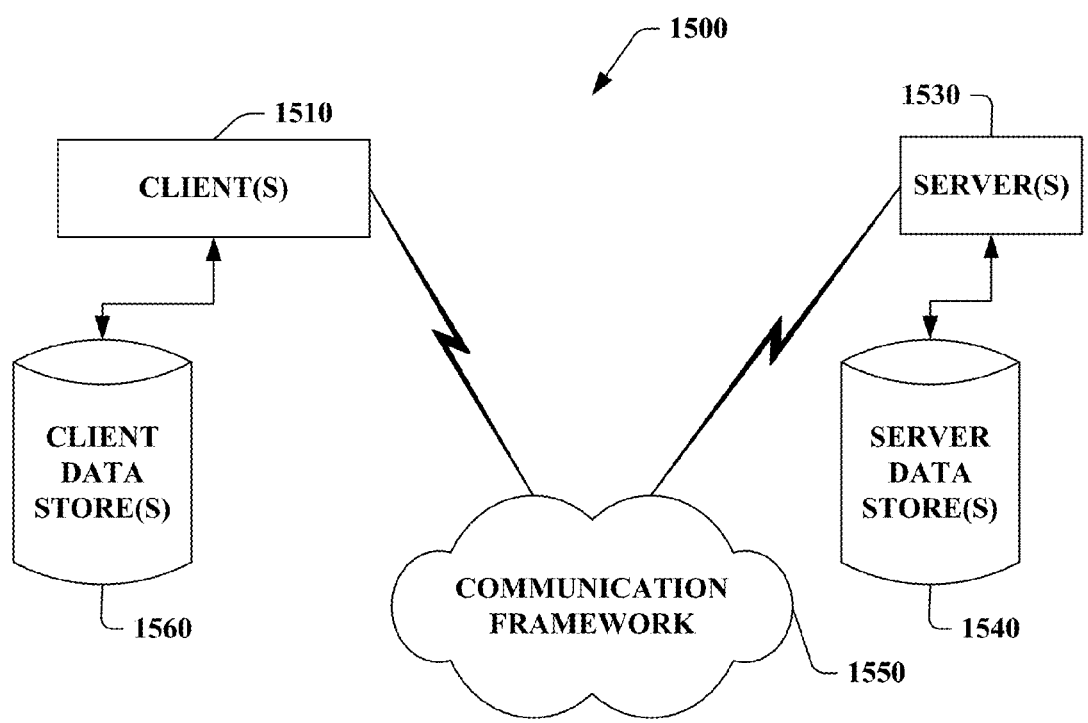
FIG. 15 is a schematic block diagram of a sample-computing environment.

In order to provide a context for the various aspects of the disclosed subject matter, FIGS. 14 and 15 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 14, an exemplary environment 1410 for implementing various aspects described herein includes a computer 1412. The computer 1412 includes a processing unit 1414, a system memory 1416, and a system bus 1418. The system bus 1418 couple system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, multi-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that various components described herein can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412 and to output information from computer 1412 to an output device 1440. Output adapter 1442 is provided to illustrate that there are some output devices 1440 like monitors, speakers, and printers, among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

FIG. 15 is a schematic block diagram of a sample-computing environment 1500 that can be employed. The system 1500 includes one or more client(s) 1510. The client(s) 1510 can be hardware and/or software (e.g., threads, processes, computing devices). The system 1500 also includes one or more server(s) 1530. The server(s) 1530 can also be hardware and/or software (e.g., threads, processes, computing devices). The servers 1530 can house threads to perform transformations by employing the components described herein, for example. One possible communication between a client 1510 and a server 1530 may be in the form of a data packet adapted to be transmitted between two or more computer processes. The system 1500 includes a communication framework 1550 that can be employed to facilitate communications between the client(s) 1510 and the server(s) 1530. The client(s) 1510 are operably connected to one or more client data store(s) 1560 that can be employed to store information local to the client(s) 1510. Similarly, the server(s) 1530 are operably connected to one or more server data store(s) 1540 that can be employed to store information local to the servers 1530.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. One or more memory storage devices including instructions, that when executed by at least one processor, perform acts comprising: detecting a first device on an interactive computer vision surface using vision-based sensing; commanding the first device to activate a light source of the first device; determining whether a position of the light source detected by the vision based sensing coincides with a position of the first device; establishing a wireless connection with the first device based at least in part on whether the position of the light source coincides with the position of the first device; detecting a second device placed on the computer vision surface; and exchanging data between the first device and the second device via gestures including a hand or a stylus on or over the computer vision surface.

2. The one or more memory storage devices of claim 1, wherein the vision-based sensing includes using an infrared-sensitive camera and an infrared illuminant.

3. The one or more memory storage devices of claim 1, wherein the light source is a modulated light source.

4. The one or more memory storage devices of claim 3, the acts further comprising decoding the modulated light source by at least one of an infrared-sensitive camera or a visible light-sensitive camera.

5. The one or more memory storage devices of claim 1, wherein the computer vision surface includes a host system of the computer vision surface to exchange data between the first device and the second device via the gestures.

6. The one or more memory storage devices of claim 1, the acts further comprising projecting a user interface on the computer vision surface.

7. The one or more memory storage devices of claim 6, wherein the user interface is projected in proximity to the first device.

8. The one or more memory storage devices of claim 1, the acts further comprising displaying data associated with at least one of the first device or the second device on the computer vision surface.

9. The one or more memory storage devices of claim 8, wherein the gestures include a hand or stylus based move, rotate or resize gesture over the displayed data on the computer vision surface to perform a respective move, rotate or resize of the displayed data.

10. The one or more memory storage devices of claim 8, wherein the gestures include a hand or stylus based drag gesture on the displayed data on the computer vision surface between the first device and the second device to copy the displayed data from the first device to the second device.

11. A method comprising:
  detecting a first device on an interactive computer vision surface using vision-based sensing;
  commanding the first device to activate a light source of the first device;
  determining whether a position of the light source detected by the vision based sensing coincides with a position of the first device;
  establishing a wireless connection with the first device based at least in part on whether the position of the light source coincides with the position of the first device;
  detecting a second device placed on the computer vision surface; and
  exchanging data between the first device and the second device via gestures including a hand or a stylus on or over the computer vision surface.

12. The method of claim 11, wherein the commanding the first device to activate the light source includes commanding the first device to activate a modulated light source.

13. The method of claim 12, further comprising decoding the modulated light source by at least one of an infrared-sensitive camera or a visible light-sensitive camera.

14. The method of claim 11, wherein the light source is at least one of an infrared light source or a visible light display of the device.

15. The method of claim 11, further comprising detecting a position of the first device.

16. The method of claim 11, further comprising projecting a user interface on the computer vision surface.

17. The method of claim 16, wherein interactions via gestures including the hand or the stylus on or over the user interface replicate interactions on the first device.

18. The method of claim 11, further comprising displaying data associated with at least one of the first device or the second device on the computer vision surface.

19. The method of claim 18, wherein the gestures include:
  a hand or stylus based move, rotate or resize gesture on or over the displayed data on the computer vision surface to perform a respective move, rotate or resize of the displayed data; and
  a hand or stylus based drag gesture on or over the displayed data on the computer vision surface between the first device and the second device to copy the displayed data from the first device to the second device.

20. A system comprising: an infrared illuminant; an infrared-sensitive camera; an input medium configured to detect a first device using vision-based sensing, the input medium including an interactive computer vision surface to provide the vision-based sensing at least in part via the infrared-sensitive camera and the infrared illuminant; and an analysis component configured to: detect the first device on the interactive computer vision surface; command the first device to activate a light source of the first device; determine whether a position of the light source coincides with a position of the first device; establish a wireless connection with the first device based at least in part on whether the position of the light source coincides with the position of the first device; detect a second device placed on the computer vision surface; detect gestures including a hand or a stylus on or over the computer vision surface; and exchange data between the first device and the second device based at least in part on the gestures.

* * * * *